March 2, 1971  W. MESSINGER  3,566,468
CUTTER FOR POWER-OPERATED SHAVERS AND METHOD
OF MAKING THE SAME
Filed May 27, 1968

Inventor
Werner Messinger
By Michael S. Striker
Attorney

United States Patent Office 3,566,468
Patented Mar. 2, 1971

3,566,468
CUTTER FOR POWER-OPERATED SHAVERS AND METHOD OF MAKING THE SAME
Werner Messinger, Kronberg, Germany, assignor to Braun Aktiengesellschaft, Frankfurt am Main, Germany
Filed May 27, 1968, Ser. No. 732,421
Claims priority, application Germany, May 31, 1967,
P 15 53 658.0
Int. Cl. B26b *19/04*
U.S. Cl. 30—346.51
13 Claims

ABSTRACT OF THE DISCLOSURE

A mobile cutter for use in power-operated shavers is assembled by temporarily mounting and fixedly holding a set of parallel steel blades in a magazine and by forcibly introducing longitudinally spaced portions of solid or hollow supporting rods of aluminum into separate lines of recesses which are formed in the blades. The blades penetrate into aluminum during forcible introduction of rods into the respective lines of recesses. The connections between the blades and the rods can be reinforced by a suitable adhesive. The planes of the blades and the axes of the rods can make an acute angle or a right angle.

BACKGROUND OF THE INVENTION

The present invention relates to power-operated shavers in general, and more particularly to improvements in cutters for use in such shavers. Still more particularly, the invention relates to cutters of the type wherein one or more supports carry a set of preferably parallel blades and which can be used in a power-operated shaver to cut bristles by moving along the inner side of a perforated foil through which the bristles extend. The invention also relates to a novel method of assembling such cutters.

In presently known cutters which comprise a set of blades, the means for supporting the blades in desired position with reference to each other normally comprises several parallel tubes or rods which extend through circular holes machined into the blades. It is also known to provide the blades with lines of open slots which can receive the supports, and the blades are thereupon fixedly secured to the supports in any one of a number of known ways. Certain manufacturers resort to the method of deforming portions of blades so that such deformed portions constitute spacers or distancing elements between the blades. The distancing elements are glued to the adjoining blades. The weight of such cutters is very low because they do not employ any supports; however, their resistance to deformation is unsatisfactory and their manufacturing cost is very high. The joints between the blades and the adjoining distancing elements must take up stresses of a magnitude which cannot be resisted by presently known adhesives.

It was also proposed to loosely insert two or more elongated supports into holes or slots provided in the blades and to thereupon deform portions of the supports in zones which are adjacent to the blades to thus provide a relatively strong connection between such parts. The deforming step includes squeezing, pinching, upsetting or flattening of supports. Such operations are time-consuming and must be carried out by resorting to complicated and expensive machines.

SUMMARY OF THE INVENTION

It is an object of my invention to provide a novel and improved method of assembling a set of blades with one or more supports in a time- and material-saving operation to produce a cutter which is surprisingly rigid and can readily resist all such stresses which arise in normal operation of a power-operated shaver.

Another object of the invention is to provide a method according to which one or more supports can be assembled with a complete set of blades in a single step.

A further object of the invention is to provide a method of the just outlined character which can be carried out by resorting to relatively simple, compact and inexpensive machinery.

An additional object of the invention is to provide a simple, lightweight, rigid and inexpensive cutter wherein the blades are assembled with one or more supports in a novel way.

An ancillary object of the invention is to provide a cutter which is particularly resistant to bending and twisting stresses and which can be produced in any desired size and/or shape to be useful in presently known types of power-operated shavers.

The method of my invention is employed in the production of a cutter which is utilized in power-operated shavers and comprises at least one support of deformable rigid material (e.g., a material having the characteristics of aluminum) and a set of blades consisting of a material (preferably steel) which is harder than the material of the support and having a line of recesses for preselected portions of the support whereby the cross-sectional areas of such portions exceed the areas of the corresponding recesses. The method comprises the step of forcibly introducing the portions of the support into the corresponding recesses so that the material of the support is deformed in response to such insertion and the blades thereupon adhere to the thus deformed support, i.e., each portion of the support is held with a tight fit in one of the recesses.

The profiles of the selected portions, prior to deformation of the support, preferably resemble the outlines of the corresponding recesses, and such recesses are preferably of a semicircular or similar outline. If desired or necessary, the method may comprise the additional step of bonding the support to the blades by employing a suitable adhesive which can be applied prior to, during or following the forcible assembly of blades with the support. The support may constitute a solid rod or a tube and the radii of semicircular recesses are at least slightly smaller than the radii of the corresponding portions of the support prior to the introducing step.

As a rule, the set of blades is provided with at least two lines of recesses and the open sides of all recesses preferably face in the same direction to permit simultaneous forcible introduction of a separate support into each line of recesses.

The novel features which are considered as characteristic of the invention are set forth in particular in the appended claims. The improved cutter itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
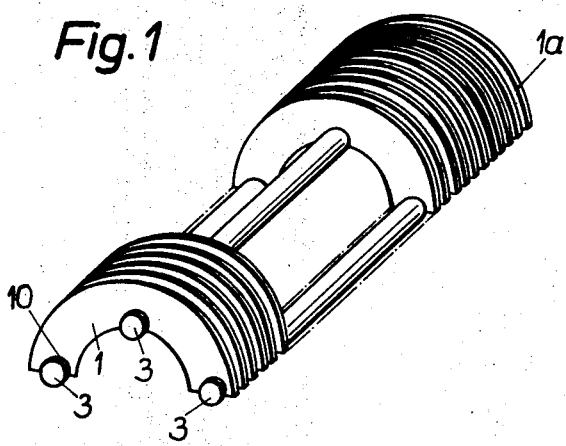
FIG. 1 is a perspective view of a cutter which embodies one form of my invention.

FIG. 1 illustrates a fully assembled cutter which can be utilized in a power-operated shaver as a movable cutter to travel back and forth adjacent to the inner side of a stationary cutter foil. It comprises a set of parallel blades 1 which are equidistant from each other and are rigid with three solid-rod-like supports 3 which are assembled therewith in accordance with the method of my invention. The blades 1 are formed with three lines or rows of substantially semicircular recesses 10 having open sides which face in the same direction, i.e., downwardly, as viewed in FIG. 1. The surfaces surrounding such recesses extend into the material of the respective supports 3 to thereby establish a rigid connection which can be reinforced by resorting to a suitable adhesive. It is equally within the purview of the invention to provide the blades 1 with a row of centrally located recesses which face downwardly and accommodate longitudinally spaced portions of the central support 3 and with two lines or rows of outer recesses whose open sides face outwardly (i.e., to the right and to the left, as viewed in FIG. 1) and each of which also accommodates a portion of one of the two outer supports 3. The two outer rows of recesses can be formed in the convex edge faces of the blades 1. An advantage of recesses whose open sides face in the same direction is that all three supports can be assembled with the blades in a single operation, namely, by forcibly introducing selected portions of all three supports into the corresponding recesses while the set of blades is being pushed against the supports or vice versa.

The blades 1 preferably consist of a hard rustproof material which is elastic to a certain degree. For example, such blades may consist of chromium-nickel steel. The material of the supports 3 is rigid but deformable and softer than the material of the blades. Good results can be obtained with supports which consist of aluminum or a like alloy. Prior to forcible introduction into the recesses 10, the radii of those portions of the supports which are received in the recesses upon assembly of the cutter exceed, at least slightly, the radii of curvature of the surfaces which surround the recesses. Consequently, each deformed portion of each support is received in the corresponding recess 10 with a tight fit which insures satisfactory adherence of blades to the supports. The blades actually penetrate into the softer material of the supports by displacing such material to insure an even stronger connection between the blades and the supports.

Figure 2:
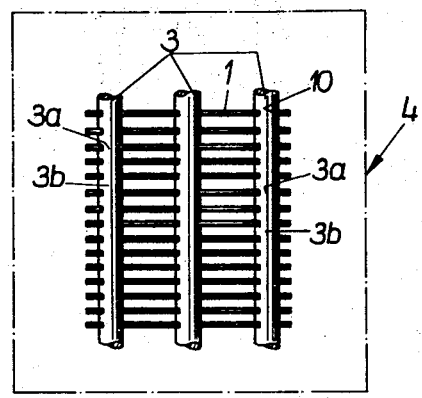
FIG. 2 is a fragmentary bottom plan view of the cutter, further showing a magazine which is utilized to locate the blades during forcible introduction of supporting members into the corresponding rows of recesses in the blades.

FIG. 2 illustrates the outline of a simple magazine 4 which is provided with compartments or slots for the blades 1 and wherein such blades are properly held during forcible introduction of supports 3 into the respective recesses, FIG. 2 also shows that the blades have penetrated into the supports 3. The transverse dimensions of those portions 3a of the supports which are surrounded by the blades are smaller than the diameters of undeformed portions 3b. In the embodiment of FIGS. 1 and 2, the planes of the blades 1 are normal to the axes of the supports 3. This is the customary way of assembling a mobile cutter for power-operated shavers.

Figure 3:
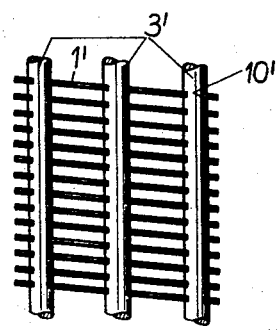
FIG. 3 is a fragmentary bottom plan view of a modified cutter.

FIG. 3 illustrates a portion of a second cutter which comprises three parallel tubular supports 3' and a set of parallel blades 1' whose planes make an acute angle with the axes of the supports. Such positioning of blades 1' provides a larger-area contact between the blades and the supports, i.e., the connection is even stronger than in the cutter of FIGS. 1 and 2. However, this normally requires the provision of recesses 10' whose outline is not exactly of semicircular shape.

It is further clear that the invention can be embodied in cutters which comprise solid or rod-like supports of other than circular outline. Circular profiles are preferred at this time because such supports are in large-area contact with the blades. Each cutter may comprise one, two, three or more supports. As stated before, the connection between the blades 1 or 1' and supports 3 or 3' can be reinforced by resorting to a suitable adhesive which can be applied prior to, during or subsequent to forcible insertion of supports into the respective lines of recesses. Adhesives of synthetic plastic material are particularly suited to such purpose.

It is also clear that the supports 3 or 3' can be assembled with the blades 1 or 1' in a series of steps, i.e., that each blade can be connected with the supports in a separate step. However, the aforementioned magazine 4 renders it possible to complete the assembly within a very short period of time because it can locate and hold a complete set of blades 1 or 1' in requisite position and permits simultaneous insertion of all three supports provided, of course, that the open sides of all recesses 10 or 10' face in the same direction or that the means for forcibly introducing the supports can move the rods with reference to each other if the open sides of at least one row of recesses face in a first direction and the open sides of the other row or rows of recesses face in one or more other directions. If the introducing means can handle a single support at a time, the assembly of blades 1 or 1' with three rods requires three successive steps. At the present time, I prefer to form the blades 1 or 1' with recesses 10 or 10' which are formed in such a way that the open sides of all rows of recesses face in the same direction and to employ a device which can simultaneously introduce three supports so that the assembly of a complete cutter requires two basic steps, namely, insertion of blades into the magazine and introduction of supports into the respective lines of recesses.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. A method of producing a cutter which is uitilized in power-operated shavers and comprises at least one support of deformable rigid material and a set of blades consisting of a material which is harder than the material of the support and having a line of recesses open to one side for preselected portions of the support whereby the cross-sectional areas of such selected portions exceed the areas of the corresponding recesses, comprising the step of moving said set of blades and said at least one support relative to each other so as to forcibly introduce said portions of the support from said open side of said recesses into the latter so that portions of said blades about said recesses will penetrate into the material of said support while deforming the material of said support in response to such insertion and the blades thereupon adhere to the thus deformed support.

2. A method as defined in claim 1, wherein the profiles of said selected portion of the support in undeformed conditions thereof resemble the outlines of the corresponding recesses.

3. A method as defined in claim 1, further comprising the step of fixing the positions of said blades with reference to each other prior to forcible introduction of said selected portions into the corresponding recesses.

4. A method as defined in claim 1, further comprising the step of bonding the support to the blades.

5. A method as defined in claim 1, wherein the support is of substantially circular cross section and said recesses have substantially semicircular outlines with radii which are at least slightly smaller than the radii of said selected portions in undeformed condition of the support.

6. A method as defined in claim 5, wherein the cutter comprises a plurality of substantially parallel rod-like supports and said set of blades comprises a separate row of recesses for each of said supports.

7. A cutter for use in power-operated shavers, comprising a set of spaced substantially parallel blades having at least one row of aligned recesses open to one side; and an elongated support including longitudinally spaced portions each of which is held with a tight interference fit in one of said recesses, said support consisting of a deformable rigid material which is softer than the material of said blades so that the support is at least slightly deformed as a result of introduction of said spaced portions for said open side of said recesses into the latter during assembly of the cutter, the planes of said blades forming acute angles with the longitudinal direction of said support.

8. A cutter as defined in claim 7, wherein said set of blades comprises at least one additional row of aligned recesses and further comprising an additional elongated support including longitudinally spaced portions each of which is held with a tight fit in one of said additional recesses, all of said recesses having open sides facing in the same direction.

9. A cutter as defined in claim 7, wherein said recesses have substantially semicircular outlines.

10. A cutter as defined in claim 7, wherein said support is a solid rod of substantially circular cross section.

11. A cutter as defined in claim 7, wherein said support is a tube.

12. A cutter as defined in claim 7, wherein said blades consist of steel and said support consists of a material having the characteristics of aluminum.

13. A cutter as defined in claim 7, wherein the profiles of said selected portions resemble the outlines of the corresponding recesses prior to assembly of the cutter and wherein said tight interference fit is achieved in response to penetration of the material of said blades into the material of said selected portions.

References Cited

UNITED STATES PATENTS

| | | | |
|---|---|---|---|
| 2,638,131 | 5/1953 | Rohs | 29—525 |
| 2,716,804 | 9/1955 | Johnson | 29—525 |
| 3,290,781 | 12/1966 | Kratz | 30—43.92 |
| 3,376,642 | 4/1968 | Liska | 30—346.51 |

OTHELL M. SIMPSON, Primary Examiner